(12) United States Patent
Fanton et al.

(10) Patent No.: US 11,391,648 B2
(45) Date of Patent: Jul. 19, 2022

(54) METHOD FOR DETECTING A DEGRADATION OF A WHEEL TIRE

(71) Applicant: SAFRAN ELECTRONICS & DEFENSE, Paris (FR)

(72) Inventors: Nicolas Fanton, Moissy-Cramayel (FR); Adrien Perigord, Moissy-Cramayel (FR); Emmanuel Couturier, Moissy-Cramayel (FR); Majurian Vijayakumaran, Moissy-Cramayel (FR); Nicolas Lipari, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/432,746

(22) PCT Filed: Feb. 21, 2020

(86) PCT No.: PCT/EP2020/054684
§ 371 (c)(1),
(2) Date: Aug. 20, 2021

(87) PCT Pub. No.: WO2020/169833
PCT Pub. Date: Aug. 27, 2020

(65) Prior Publication Data
US 2022/0099531 A1 Mar. 31, 2022

(30) Foreign Application Priority Data
Feb. 22, 2019 (FR) ...................... 19 01852

(51) Int. Cl.
*G01M 17/02* (2006.01)
*B60C 11/24* (2006.01)
(Continued)

(52) U.S. Cl.
CPC ......... *G01M 17/027* (2013.01); *B60C 11/246* (2013.01); *B60C 25/007* (2013.01);
(Continued)

(58) Field of Classification Search
CPC ........ G06T 7/37; B60C 11/246; B60C 25/007
(Continued)

(56) References Cited

U.S. PATENT DOCUMENTS 9,805,697 B1 10/2017 Dorrance et al.
10,179,487 B1 1/2019 Larson et al.
(Continued)

FOREIGN PATENT DOCUMENTS

EP 1477765 A1 11/2004
EP 1826529 A1 8/2007
(Continued)

*Primary Examiner* — Jeffery A Williams
(74) *Attorney, Agent, or Firm* — Muncy, Geissler, Olds & Lowe, P.C.

(57) ABSTRACT

A method of detecting degradation of a real tire of a wheel includes the steps of: acquiring at least one first three-dimensional object representative of the shape of the real tire by using an electronic appliance including at least one three-dimensional sensor, the first three-dimensional object being made up of a set of capture points; determining the position of the center point of the real tire from the set of capture points; registering the first three-dimensional object to obtain a second three-dimensional object; transforming the second three-dimensional object in order to obtain one or more two-dimensional objects; and analyzing the two-dimensional object(s) in order to detect degradation of the real tire.

17 Claims, 14 Drawing Sheets

(51) Int. Cl.
*B60C 25/00* (2006.01)
*G06T 7/37* (2017.01)
*G01B 11/22* (2006.01)

(52) U.S. Cl.
CPC ............... *G01B 11/22* (2013.01); *G06T 7/37* (2017.01); *G06T 2207/20061* (2013.01)

(58) Field of Classification Search
USPC .......................................................... 73/146
See application file for complete search history.

(56) References Cited

U.S. PATENT DOCUMENTS

2015/0035971 A1   2/2015  Bogenschuetz
2022/0051391 A1*  2/2022  Bogomolny .............. G06T 7/11

FOREIGN PATENT DOCUMENTS

| FR | 2925706 A1 | 6/2009 |
|----|---|---|
| WO | WO-2012/156260 A1 | 11/2012 |
| WO | WO-2015/016888 A1 | 2/2015 |
| WO | WO-2015/110841 A1 | 7/2015 |
| WO | WO-2017/017371 A1 | 2/2017 |

* cited by examiner

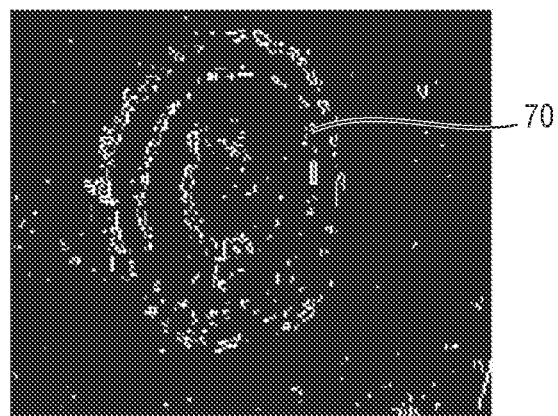
Fig. 26
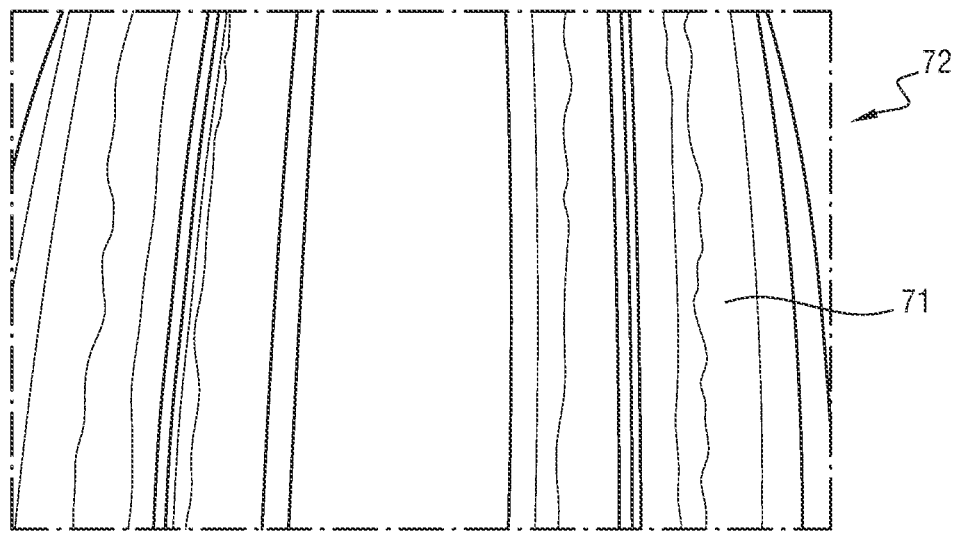
Fig. 27
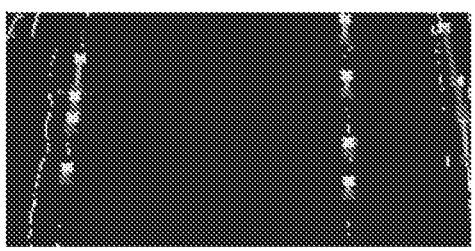 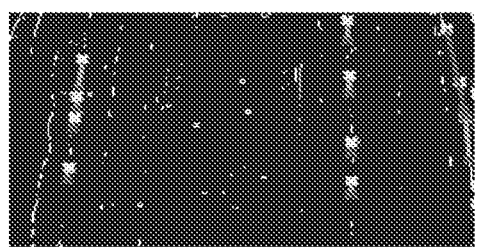
Fig. 28      Fig. 29

$$M = \begin{matrix} 1 & 0 & -1 \\ 0 & 0 & 0 \\ -1 & 0 & 1 \end{matrix}$$

METHOD FOR DETECTING A DEGRADATION OF A WHEEL TIRE

The invention relates to the field of methods of detecting degradation of a wheel tire.

BACKGROUND OF THE INVENTION

The tires of airplane wheels are subjected to very high stresses, in particular during stages of takeoff and landing. On takeoff, the tires are subjected both to the weight of the airplane and to the speed of takeoff, and they heat up briefly, but considerably. On landing, at the moment when the wheels of the airplane touch the ground, the tires go from a speed of zero to a very high speed in a very short length of time.

These phenomena tend to subject tires to wear. Unfortunately, the deterioration of a tire can lead to excessive slip, to excessive friction, or even to said tire bursting. It is therefore fundamental, for safety reasons, to be able to estimate the wear of tires accurately and reliably in order to ensure that such wear remains at a level that is acceptable.

When the level of wear of a tire reaches a certain threshold, the tire is sent back to the factory for retreading. In general, it is tire manufacturers who act on behalf of airlines to supply and to maintain tires. The number of tires used by airlines is very large, so it is important for tire manufacturers that tires are removed at the right time, neither too soon, in order to avoid pointlessly taking usable tires out of service, nor too late, so that tire wear does not become excessive.

Thus, an accurate and reliable estimate of the level of tire wear is necessary for the safety of an airplane, and it is also advantageous from an economic point of view.

At present, two main methods are used by ground operatives in order to evaluate the wear of a tire.

A first method consists in visually estimating the level of wear and the degradation of the tire.

A second method consists in manually measuring the depth of the treads and the wear indicators of the tire.

Both of those methods give rise to a large number of errors. The estimates and measurements that are made are subjective, and they depend to a great extent on the ground operative concerned. Proposals have therefore been made to have the measurements taken by several ground operatives, however such a solution is expensive and time-consuming.

Furthermore, those methods serve only to detect when the level of wear means that the tire needs to be replaced, and they do not serve to anticipate replacement of said tire.

OBJECT OF THE INVENTION

One object of the invention is to detect degradation of a tire (such as excessive wear) in reliable manner, and another is to improve maintaining a large number of tires.

SUMMARY OF THE INVENTION

In order to achieve this object, there is provided a detection method for detecting degradation of a real tire of a wheel, the method comprising the steps of:

acquiring at least one first three-dimensional object representative of the shape of the real tire by using an electronic appliance including at least one three-dimensional sensor, the first three-dimensional object being made up of a set of capture points;

determining the position of a center point for the real tire from the set of capture points;

registering the first three-dimensional object relative to a theoretical tire of known dimensions and orientation in order to obtain a second three-dimensional object forming a registered tire;

transforming the second three-dimensional object in order to obtain one or more two-dimensional objects; and analyzing the two-dimensional object(s) in order to detect degradation of the real tire.

The detection method of the invention thus makes it possible to detect degradation of the real tire in a manner that is automatic, and thus objective and reliable.

The detection method also makes it possible to acquire and to conserve data about the state of a large number of real tires. Data is acquired both simply and quickly, since in order to perform detection, it suffices to bring the electronic appliance close to the real tire.

The detection method thus makes it possible to perform predictive maintenance operations on a very large number of real tires, and in particular it makes it possible to anticipate degradation and replacement of real tires.

There is also provided a detection method as described above, wherein determining the position of the center point of the real tire comprises the step of defining, for each capture point, a normal vector that is normal to a surface of the first three-dimensional object and that passes through said capture point, and the step of estimating a position for the center point of the real tire from the normal vectors.

There is also provided a detection method as described above, wherein the position of the center point is estimated by an iterative process during which, on each iteration, capture points that do not belong to the real tire are eliminated, capture points that belong to the real tire are conserved, and the estimate of the position of the center point is refined by using the normal vectors of the capture points belonging to the real tire.

There is also provided a detection method as described above, wherein the position of the center point of the real tire is determined by performing a data partitioning method to distinguish between first capture points belonging to the real tire and second capture points belonging to the ground.

There is also provided a detection method as described above, wherein registering makes use of a registration algorithm based on Euclidean transformations.

There is also provided a detection method as described above, wherein registering also uses an ICP algorithm.

There is also provided a detection method as described above, wherein transforming comprises the step of slicing the second three-dimensional object on planes perpendicular to the axis of rotation of the registered tire in order to obtain a plurality of three-dimensional slices of small thickness, and the step of approximating each three-dimensional slice by a two-dimensional slice of zero thickness, the two-dimensional object(s) comprising the two-dimensional slices.

There is also provided a detection method as described above, including the steps, for each two-dimensional slice, of calculating a radius $r_i(\alpha)$ for the two-dimensional slice, which radius is a function of an angle $\alpha$ about the axis of rotation of the registered tire.

There is also provided a detection method as described above, wherein for each two-dimensional slice, a mean radius is calculated for the two-dimensional slice $T2d_i$, and wherein variation of the mean radius as a function of i is investigated (where i is the index of the slice $T2d_i$).

There is also provided a detection method as described above, wherein variation of the mean radius is used to detect abnormal degradation of the tread of the real tire, as constituted by asymmetrical wear or by flattening or by bulging or by cupping or by the presence of a foreign body.

There is also provided a detection method as described above, wherein the positions of grooves in the tread are detected and depth is evaluated for each groove, the depths of the grooves being used to detect degradation that is excessive or abnormal, and the positions of the grooves are used to locate degradation that is excessive or abnormal.

There is also provided a detection method as described above, wherein the electronic appliance further includes a photographic sensor arranged to acquire color associated with each capture point, wherein transforming comprises two-dimensional projection applied to the second three-dimensional object, and wherein the two-dimensional object(s) comprise a two-dimensional image of the tread of the registered tire as obtained by said two-dimensional projection.

There is also provided a detection method as described above, wherein analyzing the two-dimensional image comprises the step of analyzing variation of a color gradient in the two-dimensional image.

There is also provided a detection method as described above, wherein the analyzed variation of the color gradient is used to detect abnormal degradation as constituted by excessive wear leading to a metal mesh of the real tire becoming apparent or as constituted by heat being given off or by contamination.

There is also provided a detection method as described above, wherein analyzing the two-dimensional image comprises the step of applying a Hough transform to the two-dimensional image.

There is also provided a detection method as described above, wherein the Hough transform serves to detect abnormal degradation as constituted by flattening or by bulging or by cupping or by the presence of a foreign body on the tread.

There is also provided a detection method as described above, wherein analyzing the two-dimensional image comprises the step of performing training based on convolutional neural networks applied to images of the real tire in good condition and also to images of the various looked-for degradations.

The invention can be better understood in the light of the following description of a particular, nonlimiting embodiment of the invention.

BRIEF DESCRIPTION OF THE DRAWINGS

Reference is made to the accompanying drawings, in which:

FIG. 26 shows the application of a Hough transform to a two-dimensional image of a real tire having flattening formed on its tread;

FIG. 27 shows the tread of a real tire that is contaminated;

FIG. 28 shows the variation of the color gradient in a two-dimensional image corresponding to a real tire that is not contaminated;

FIG. 29 shows the variation of the color gradient in a two-dimensional image corresponding to a real tire that is contaminated;

DETAILED DESCRIPTION OF THE INVENTION

The detection method of the invention is performed below for detecting degradation of a real tire of an airplane wheel. The term "real tire" is used to mean a genuine tire mounted on the wheel, as contrasted to a "virtual" tire such as the theoretical tire and the registered tire that are referred to below.

Figure 1:
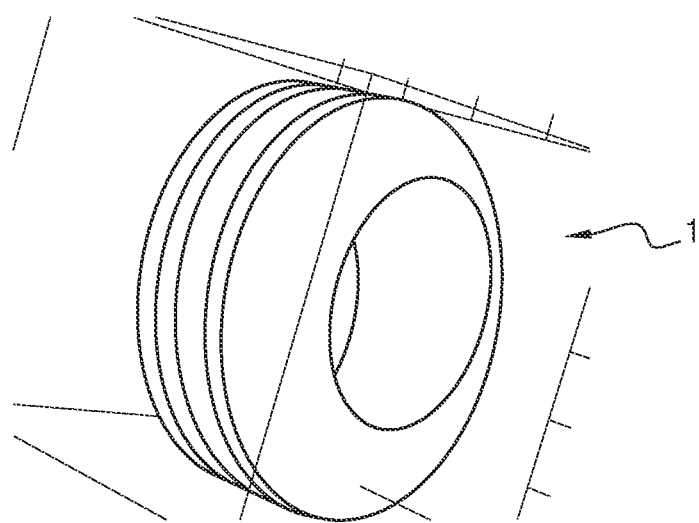
FIG. 1 shows a first three-dimensional object that is representative of the shape of a real tire.

With reference to FIG. 1, the detection method starts with a step of acquiring at least a first three-dimensional object 1 that is representative of the shape of the real tire, by using an electronic appliance that includes both a three-dimensional sensor and a photographic sensor.

By way of example, the electronic appliance may be a smartphone that is brought up to the real tire by a ground operative.

By way of example, the three-dimensional sensor is a stereo camera adapted to perform a three-dimensional scan function. By way of example, the first three-dimensional object 1 is a three-dimensional image.

The first three-dimensional object 1 is formed by a set of capture points (also referred to as a "cloud" of capture points).

The smartphone acquires and stores the first three-dimensional object 1.

It should be observed that it is possible to use any type of three-dimensional sensor that is capable of obtaining a three-dimensional object that is made up of points and that represents the shape of the real tire. It should also be observed that the electronic appliance could naturally be other than a smartphone. By way of example, a 3D camera connected to a computer could be used.

The photographic sensor serves to acquire color that is associated with each capture points.

Each capture point is made up of three-dimensional Cartesian coordinates (x, y, z). The capture points represent the scanned portion of the real tire.

The recording presents capture points at a density that is high enough for it to be possible to perform accurate calculations on the basis of the capture points. In this example, the density is 60 capture points per square centimeter on average.

Below, a fixed reference frame is used, specifically a cylindrical coordinate system, in which the axis of rotation of the real tire is caused to correspond to a straight line having the following coordinates:

$$(r, \Theta, z) = (0, 0, z)$$

The position of the center point of the real tire is determined from the set of capture points. The position of the center point of the real tire serves to enable the real tire to be extracted from the first three-dimensional object 1, and thus serves to eliminate the surroundings of the real tire from the first three-dimensional object 1. These surroundings include in particular the ground on which the real tire is standing.

In a first implementation, the position of the real tire is defined from an estimate of the position of the center point of the real tire. The center point of the real tire is a point that is situated "at the center" of the real tire. The center point is situated where the axis of rotation of the real tire intersects the plane of symmetry of the real tire that is perpendicular to the axis of rotation.

The position of the center point is estimated as follows.

The capture points of the recording are situated either on a surface of the real tire, or else on a surface of the ground. Each capture point thus forms a vertex positioned on a surface. The recording provided by the three-dimensional sensor produces the (x, y, z) coordinates of each vertex in a rectangular reference frame at life size. The center of this rectangular reference frame is determined by the three-dimensional sensor.

In order to simplify calculation, the capture points, or vertices, are normalized in [0, 1] in order to have a reference frame that is intrinsic to the data. This conserves a common scale for all of the capture points, and facilitates defining the normalizations performed in the subsequent calculations.

In order to produce the normalized vertices, the following calculation is performed:

$$P\text{norm} := (P - \min(P)) / |\max(P)|$$

where:
Pnorm is the set of normalized vertices having the coordinates (xpnorm, ypnorm, zpnorm), which are normalized in [0, 1]
P is the set of non-normalized vertices, having the coordinates (xp, yp, zp);
min(P) is the minimum value of xp, yp, and zp; and
max(P) is the maximum value of xp, yp, and zp.

The three-dimensional sensor also serves, for each vertex, to determine the vectors that are normal to the surface (of the real tire or of the ground). Each normal vector has a norm equal to 1.

The normalized vertices and the normal vectors are used to evaluate the position of the center point.

Figure 2:
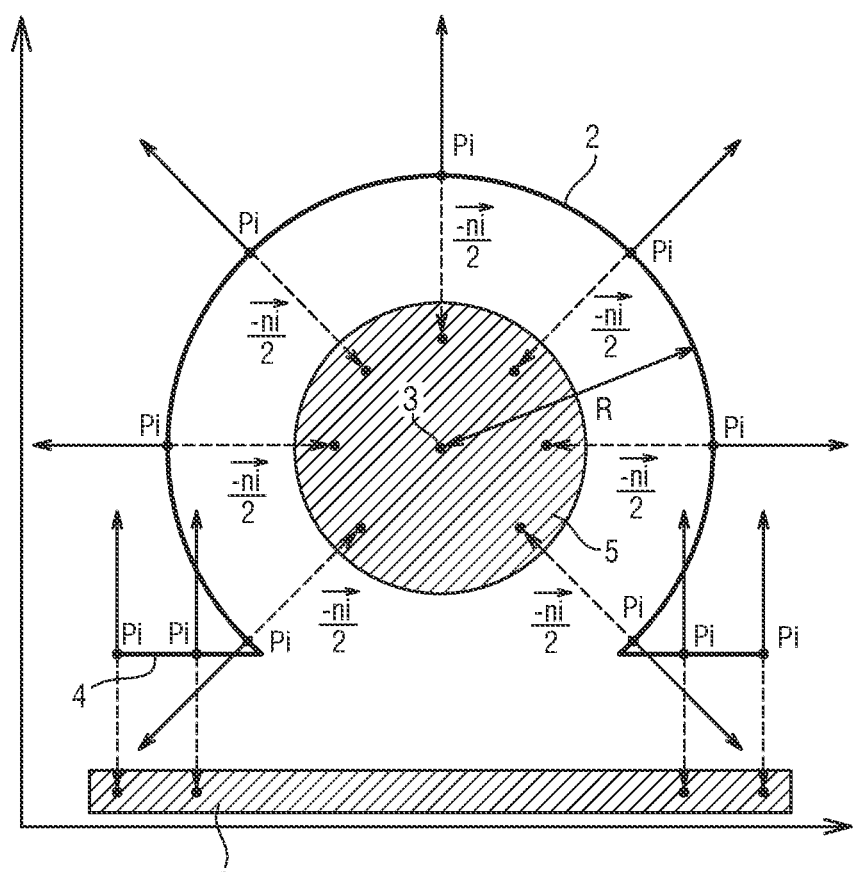
FIG. 2 shows, in a two-dimensional reference frame, a method that is used for estimating the position of a center point for the real tire.

With reference to FIG. 2, the circle 2 is an approximation to a view of the tread of the real tire as seen in section on a plane perpendicular to the axis of rotation of the real tire. The circle 2 thus defines the surface of the real tire at its tread. The circle 2 has a center 3.

Likewise, lines 4 define the surface of the ground.

By definition, each normal vector ni that is normal to the surface of the real tire and that passes through a capture point Pi situated on the circle 2 points away from the center 3 of said circle 2. The vector −ni that is opposite to the normal vector thus points towards the center 3 of the circle 2, which is an estimate of the position of the center point.

In contrast, the normal vectors that are normal to the surface of the ground and that pass through capture points Pi situated on the lines 4 point in other directions.

The position Pi−ni/2 is thus calculated for each capture point Pi.

For the great majority of capture points Pi, which are situated on the tread (i.e. on the circle 2 of FIG. 2), these positions lie within a first zone 5 that is close to the center point 3.

For the "interfering" capture points Pi, which belong to the ground on which the real tire stands, these positions lie within a second zone 6 that is remote from the center point 3.

The estimated center point 3 is the geometrical mean of the points situated in the first zone 5 and in the second zone 6, with this applying on each iteration.

The position of the center point is estimated by using an iterative process during which, on each iteration, capture points that do not belong to the real tire (and that thus comprise the capture points belonging to the ground) are eliminated, while capture points that belong to the real tire are conserved, and the estimate of the position of the center point is refined by using the normal vectors of the capture points belonging to the real tire.

Figure 3:
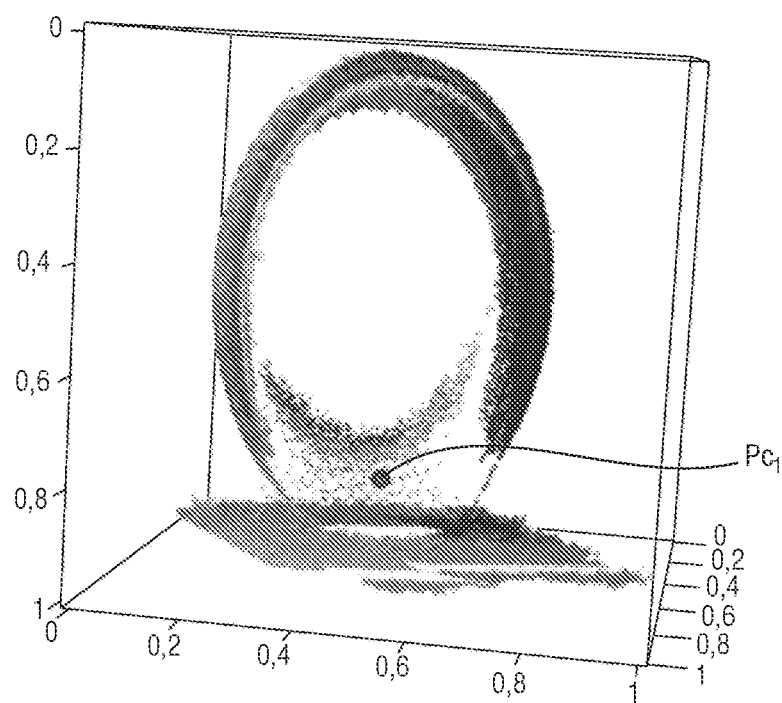
FIG. 3 shows capture points and a first estimate of the position of the center point.

With reference to FIG. 3, a first estimate $Pc_1$ for the position of the center point is obtained from the normal vectors:

$$Pc_i = (\Sigma Pi - Pi - \Sigma \vec{ni}/2) / N_{points}$$

$$= (\Sigma Pi - \vec{ni}/2)) / N_{points}.$$

where $N_{points}$ is the number of capture points under consideration.

The distance between each capture point and the first estimate $Pc_1$ for the position of the center point is then calculated.

Assuming that the ground operative uses the smartphone to acquire mainly the real tire, and assuming that the real tire is spherical in shape, the capture points are concentrated on a given radius.

Figure 4:
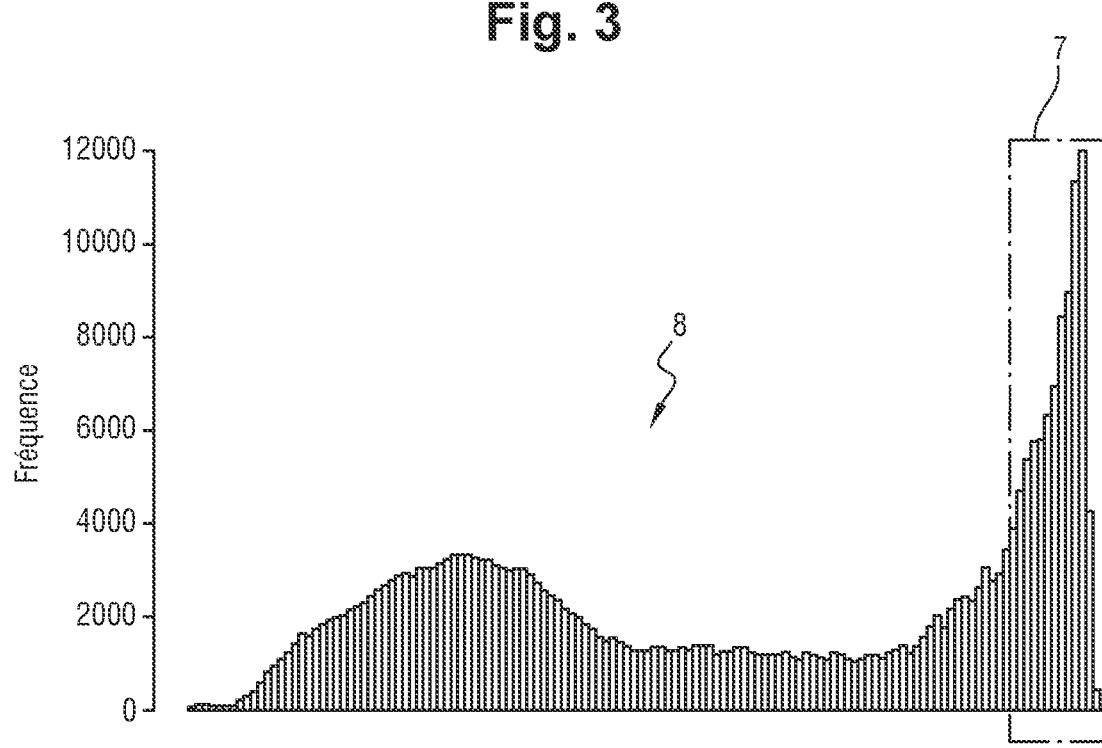
FIG. 4 is a histogram showing the distribution of distances between the capture points and the first estimate of the position of the center point.

This can be seen clearly in FIG. 4. The peak of histogram portion 7 corresponds to the tread of the real tire, while histogram portion 8 corresponds to the surroundings of the real tire, and in particular to the capture points that are situated on the ground.

The capture points that do not belong to the peak of histogram portion 7 are then eliminated and the position of the center point is calculated once more. This serves to limit the set of capture points to a zone covering the radius that appears the most frequently.

A second estimate $PC_2$ is thus obtained for the position of the center point.

This process is repeated until the following relationship is obtained between the current estimate $Pc_n$ for the position of the center point and the estimate $Pc_{n-1}$ that was obtained at the preceding iteration:

$$\|Pc_n - Pc_{n-1}\| < \varepsilon$$

where $\varepsilon$ is a predetermined stop threshold, e.g. equal to 0.001 meters.

Figure 5:
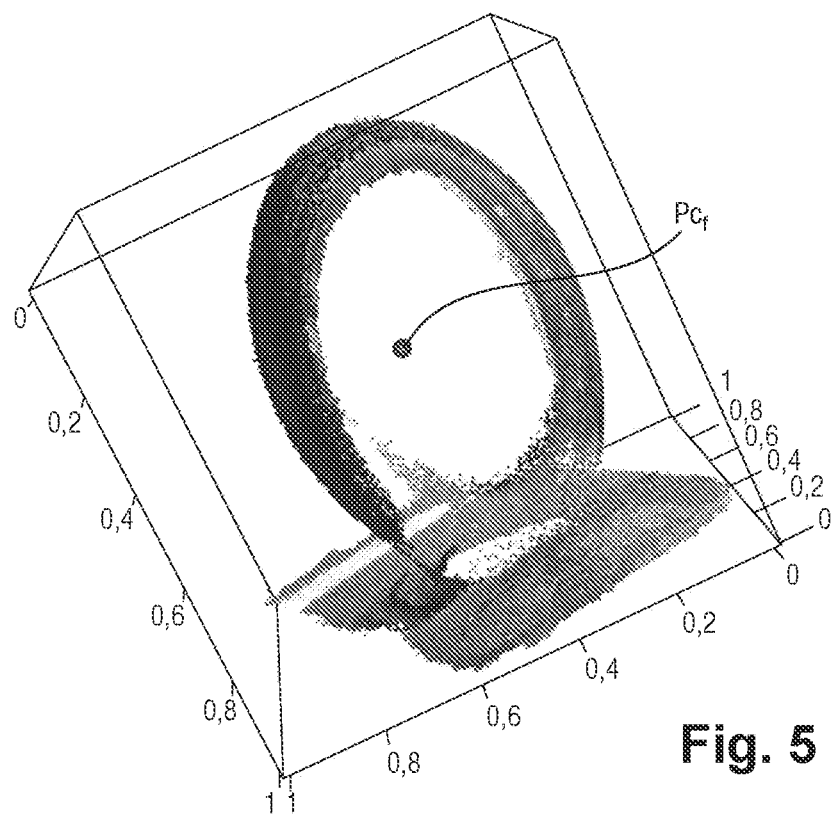
FIG. 5 shows the capture points and a final estimate of the position of the center point.

The final estimate $Pc_f$ for the position of the center point is thus obtained, as can be seen in FIG. 5.

Figure 6:
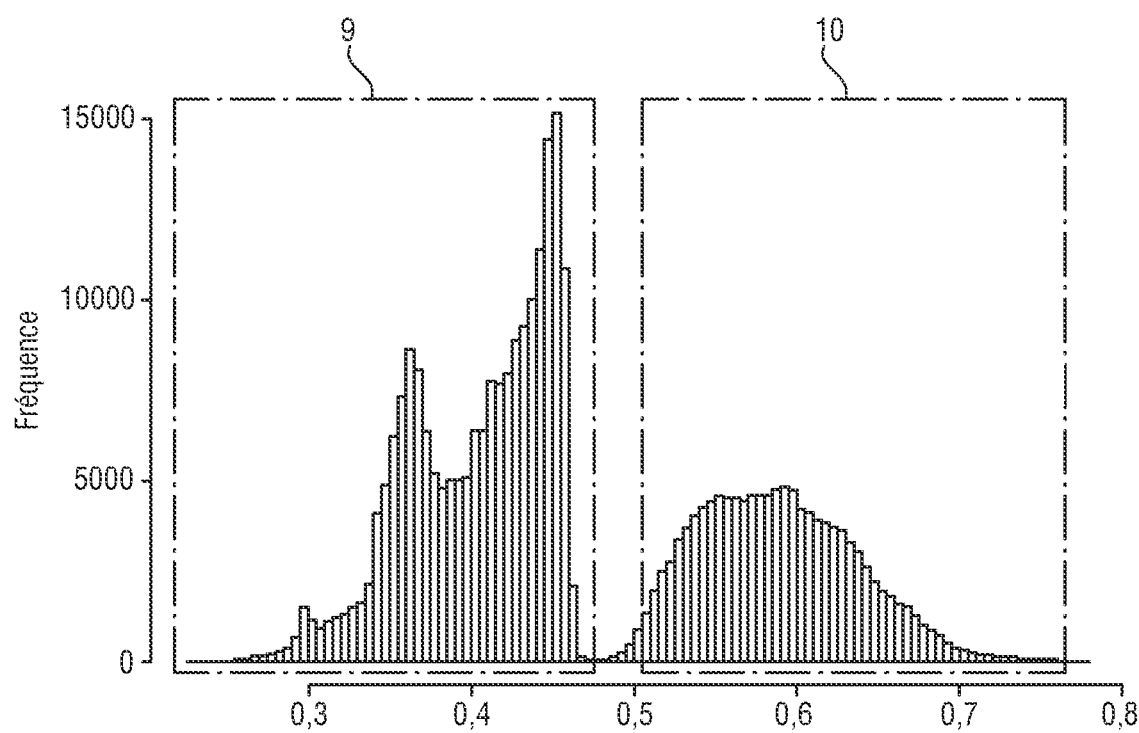
FIG. 6 is a histogram showing the distribution of distances between the capture points and the final estimate of the position of the center point.

On the basis of the distances between the capture points and the final estimate $Pc_f$ for the position of the center point, FIG. 6 shows clearly a histogram portion 9 that corresponds to the real tire and a histogram portion 10 that corresponds to the ground.

The capture points belonging to the real tire are then isolated from the capture points belonging to the surroundings of the real tire (and in particular on the ground), with only the capture points belonging to the real tire being conserved.

It is possible to define the position of the tread from the spherical shape of the real tire and from the final estimate $Pc_f$ for the position of the center point. This is based on the principle that all of the capture points of the tread are situated at a constant distance R from the center point.

The position of the real tire is thus obtained.

Figure 7:
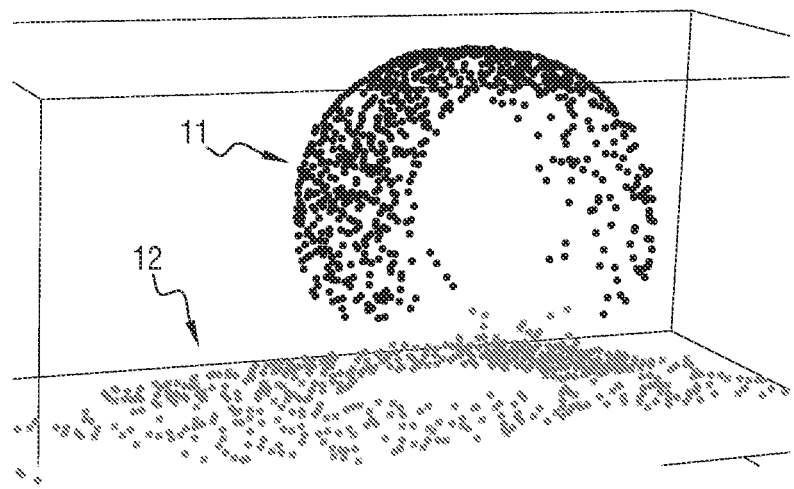
FIG. 7 shows the implementation of a data partitioning method.

In a second implementation, and with reference to FIG. 7, the position of the real tire is determined by performing a data partitioning method to distinguish between first capture points 11 belonging to the real tire and second capture points 12 belonging to the ground.

Data partitioning (also known as data "clustering") is an analysis method that serves to subdivide a dataset into a plurality of sub-sets that share common characteristics.

When detecting the position and the orientation of the real tire in the set of capture points, it is postulated that the portion of the real tire that is in contact with the ground cannot be captured. This implies some form of "cut-off" between the first capture points 11 and the second capture points 12.

In this example, the data is partitioned by using a DBSCAN algorithm (for "density-based spatial clustering of applications with noise").

As can be seen in FIG. 7, the first capture points 11 belonging to the real tire are clearly distinguished from the second capture points 12 belonging to the ground: this enables the position of the real tire to be determined effectively.

Figure 8:
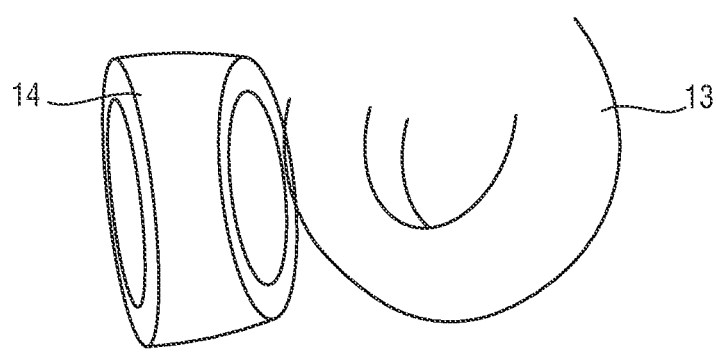
FIG. 8 shows, the real tire and a theoretical tire prior to registration.
Figure 9:
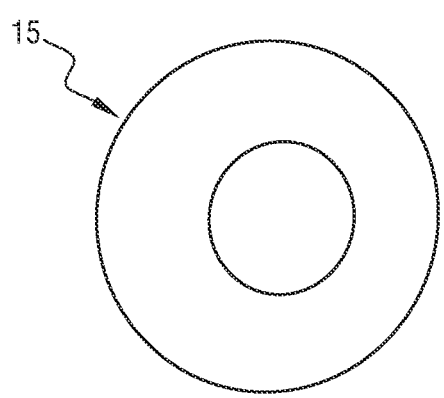
FIG. 9 shows, after registration, a second three-dimensional object as obtained by registering the first three-dimensional object and forming a registered tire.

With reference to FIGS. 8 and 9, once the position of the real tire 13 has been estimated, the first three-dimensional object 13 is registered relative to a theoretical tire 14 in order to obtain a second three-dimensional object 15 that forms a "registered" tire. The second three-dimensional object 15 is made up of a set of registered points.

To do this, the number of capture points is initially reduced by sampling.

Thereafter, on the basis solely of a portion of the tread and of a portion of the sidewalls of the real tire, a registration algorithm is applied for registering relative to a cloud of theoretical points that correspond to the theoretical tire 14.

Registration serves to determine the axis of rotation of the real tire. The theoretical tire 14 is created specifically for registering purposes. In particular, the theoretical tire 14 presents dimensions and an orientation that are known. Use is made in particular of input data including the axis of rotation and the center point of the theoretical tire 14.

Registration makes use of a registration algorithm based on Euclidean transformations.

Euclidean transformations (rotation, translation) are performed towards a known reference frame, which do not transform the object. Euclidean transformations are defined by:

$$T(v) = R\ v + t,$$

where:
v is a vector of the object;
R is an orthogonal transformation; and
t is a translation vector.

Registration consist in finding the transformation that serves to minimize the difference between the cloud of capture points and the cloud of theoretical points. In this example, use is made of an algorithm of the iterative corresponding point (ICP) type.

There follows a description of the processing performed on the second three-dimensional object 15 forming the registered tire.

This processing consists in transforming the second three-dimensional object 15 forming the registered tire so as to obtain one or more two-dimensional objects, and then in analyzing the two-dimensional object(s) in order to detect degradation of the real tire.

Figure 10:
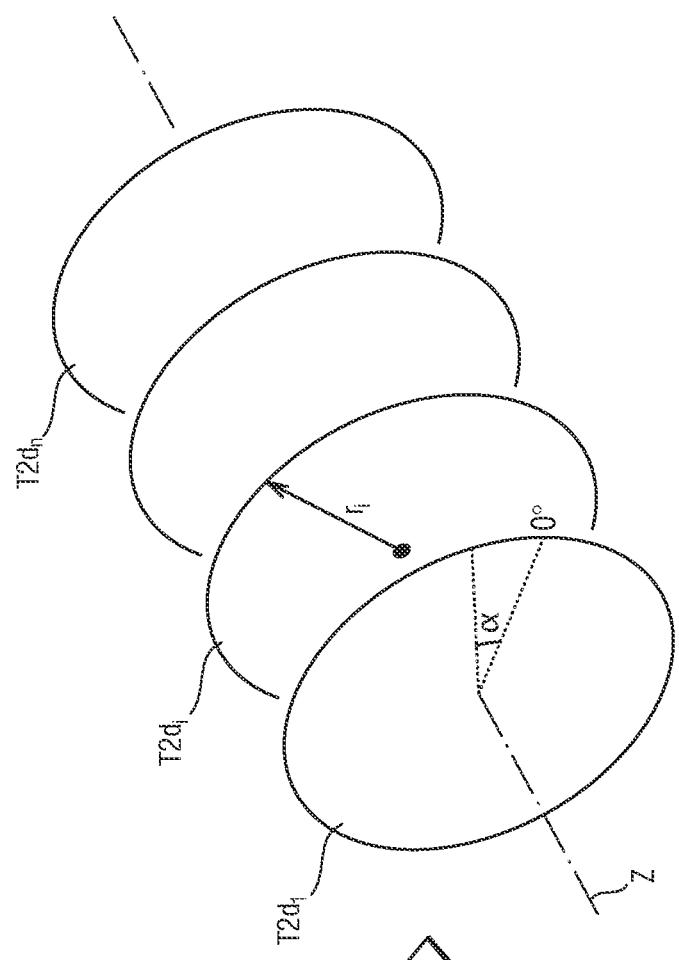
FIG. 10 shows three-dimensional slices and two-dimensional slices of a registered tire.
Figure 10:
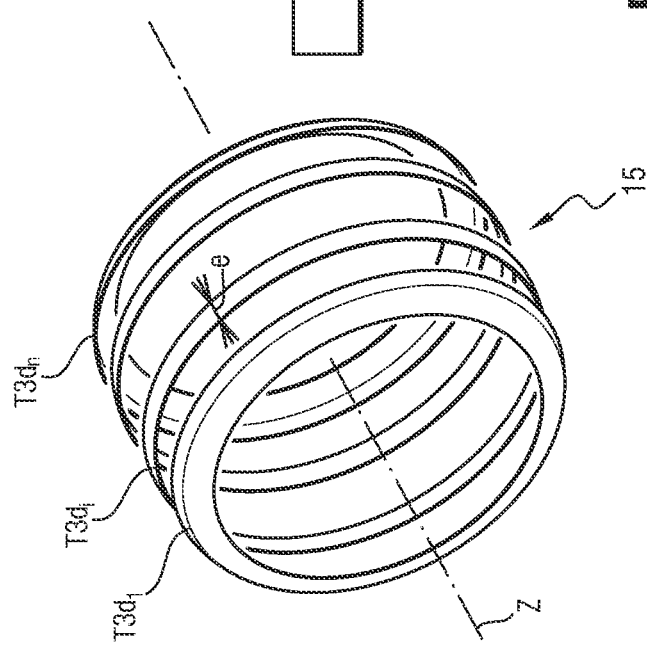

With reference to FIG. 10, in a first implementation, the transformation consists initially in slicing the second three-dimensional object 15 on planes perpendicular to the axis of rotation Z of the registered tire in order to obtain a number n of thin three-dimensional slices $T3d_1 \ldots T3d_i \ldots T3d_n$. The thickness e of each three-dimensional slice $T3d_i$ is of millimeter order.

A number n of the three-dimensional slices $T3d_i$ is obtained that make up the registered tire when they are stacked together along the axis of rotation Z of the registered tire.

The sum of the thicknesses of all of the three-dimensional slices $T3d_i$ is thus equal to the width of the tread of the registered tire.

The thickness of each three-dimensional slice $T3d_i$ is very small compared with the radius of the registered tire.

Each three-dimensional slice $T3d_i$ is thus approximated by a two-dimensional slice $T2d_i$, of zero thickness. The two-dimensional objects that result from the transformation thus comprise the two-dimensional slices $T2d_i$.

Each two-dimensional slice $T2d_i$ is thus generally in the shape of a circle if the smartphone acquires the entire circumference of the real tire, or in the shape of an angular portion of a circle if the smartphone acquires only an angular portion of the circumference of the real tire.

A radius $r_i(\alpha)$ is then calculated for each two-dimensional slice $T2d_i$. The radius $r_i(\alpha)$ is a function of an angle $\alpha$ about the axis of rotation z. The radius $r_i(\alpha)$ is not necessarily constant as a function of the angle $\alpha$, since the wear of the real tire is not necessarily uniform around the entire circumference of the two-dimensional slice $T2d_i$.

Variation in the radius $r_i(\alpha)$ is then investigated by varying i in order to detect any difference in radius of the registered tire along the axis of rotation Z (i.e. across the width of the tread), and thus to detect any degradation of the real tire.

The differences between the radii $r_i(\alpha)$ for varying i should then present variations that are regular, representative of the presence of structures of the real tire, and the depths of the structures can then be quantified.

The presence of grooves in the tread of the real tire should thus be perceptible, which grooves are presently used for visually evaluating the wear of the real tire.

Naturally, this analysis may be performed at constant $\alpha$, or else by causing the angle $\alpha$ to vary over a defined angular interval.

It is also possible to calculate the mean the radius $r_i$ of each two-dimensional slice $T2d_i$. Variation in the mean radius $r_i$ is then investigated as a function of i, i.e. along the axis of rotation z.

Variation in the radius $r_i(\alpha)$ with varying angle $\alpha$ is also investigated in order to detect angular variations in the radius of the registered tire, and thus in order to detect degradation of the real tire.

For a given two-dimensional slice $T2d_i$, the radius $r_i(\alpha)$ should normally present very little variation as a function of the angle $\alpha$, which implies wear that is regular.

If this is not so, then the coordinates (r, Θ, z) of the capture points serve to provide information about the presence, the shape, and the depth of an anomaly.

One or more parameters are then analyzed from among the variation of the radius $r_i(\alpha)$ as a function of i, the variation of the radius $r_i(\alpha)$ as a function of $\alpha$, and the variation of the mean radius $r_i$ as a function of i. By studying these radius variations, it is possible to determine an unexpected change, such as a localized or continuous reduction of this radius.

Figure 11:
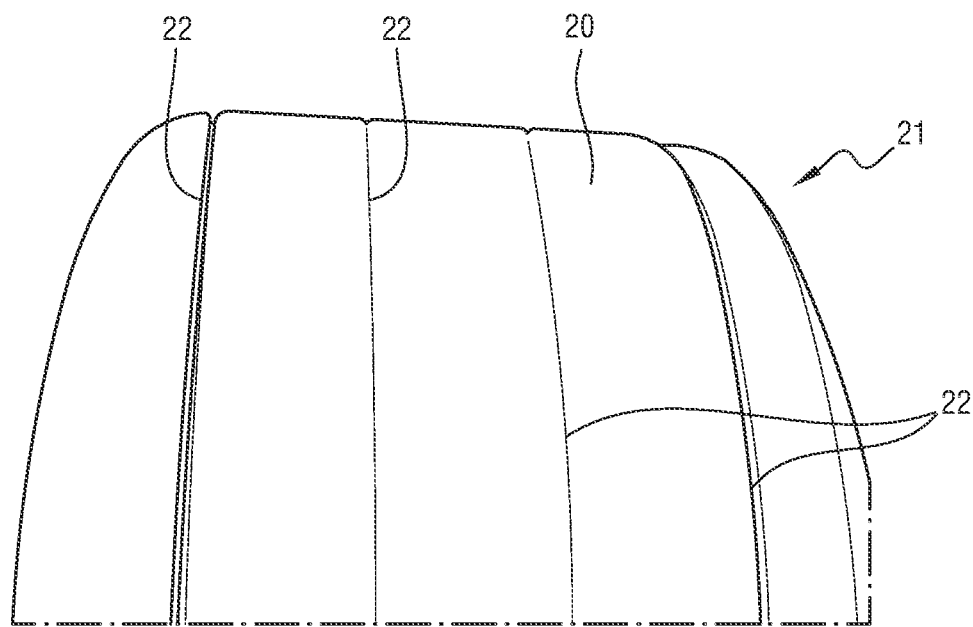
FIG. 11 shows the tread of a real tire, showing normal wear.

FIG. 11 shows the tread 20 of a real tire 21 that presents normal wear. It can be seen that the four grooves 22 are worn symmetrically and regularly around the axis of rotation of the real tire 21.

Figure 12:
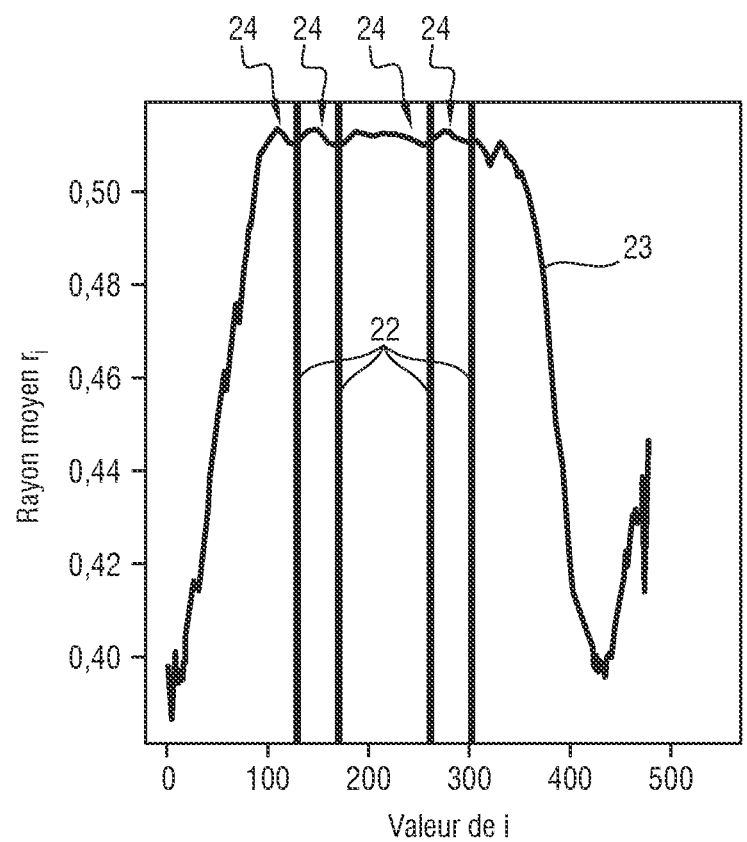
FIG. 12 is a graph plotting a curve showing how the mean radius of the registered tire corresponding to the real tire of FIG. 11 varies relative to the axis of rotation.

The curve 23 in FIG. 12 is a plot as a function of the value of i showing variation in the mean radius $r_i$ of the registered tire that corresponds to the real tire 21 of FIG. 11.

From the curve 23, there can be seen four curved portions 24, each corresponding to a small mean radius $r_i$ and to a respective one of the four grooves 22 present in the tread 20 of the real tire 21 (on the graph, the grooves 22 are represented by bold lines showing the positions of said grooves 22 across the width of the tread 20).

It is thus possible to detect the positions of the grooves 22 on the tread 20 and to evaluate the depth of each groove 22.

Evaluating the depth of each groove 22 can make it possible to detect the presence of degradation of the tread 20.

Detecting the positions of the grooves 22 serves to position the degradation on the tread 20.

In this example, the tread 20 does not present any abnormal degradation. The wear of the real tire 21 is normal and symmetrical, and each of the grooves 22 has a depth that is more or less constant.

Figure 13:
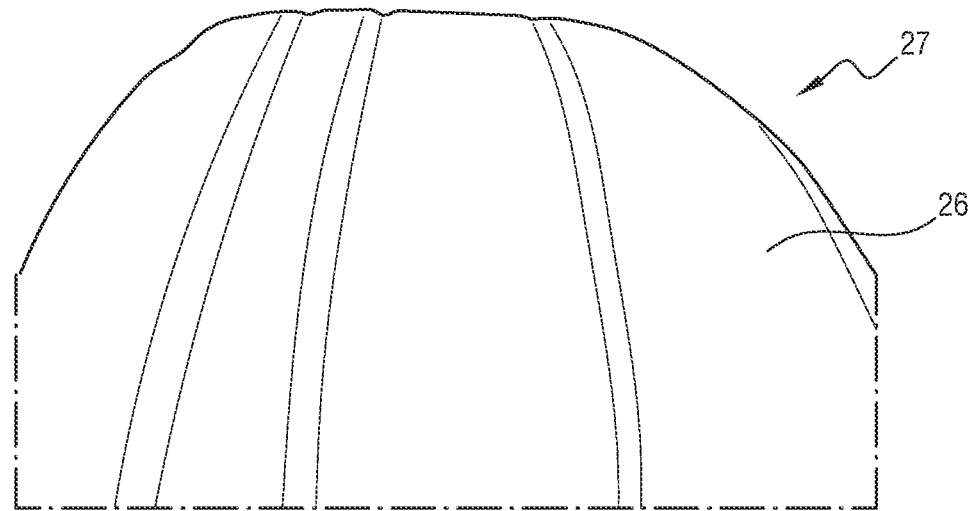
FIG. 13 shows the tread of a real tire that presents asymmetrical wear.

FIG. 13 shows the tread 26 of a real tire 27, which tread presents wear that is abnormal, asymmetrical, and poorly distributed across the tread 26.

Figure 14:
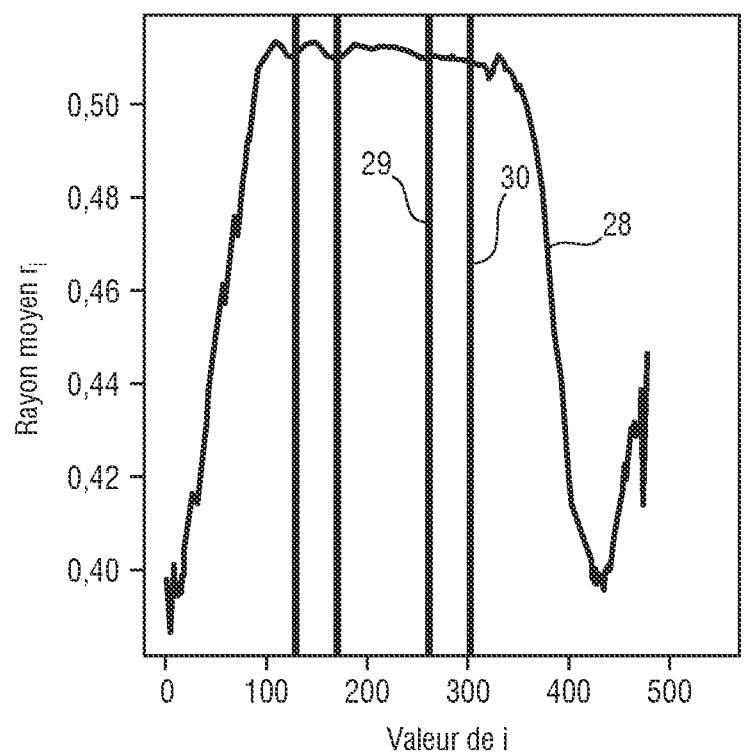
FIG. 14 is a graph plotting a curve showing how the mean radius of the registered tire corresponding to the real tire of FIG. 13 varies relative to the axis of rotation.

The curve 28 of the graph in FIG. 14 shows that the grooves 29 and 30 present depths that are very small compared with the other grooves. The mean radius of the registered tire varies very little in these grooves, which is representative of wear that is excessive and not symmetrical, since the wear relates to two grooves both situated on the same side of the tread 26.

Figure 15:
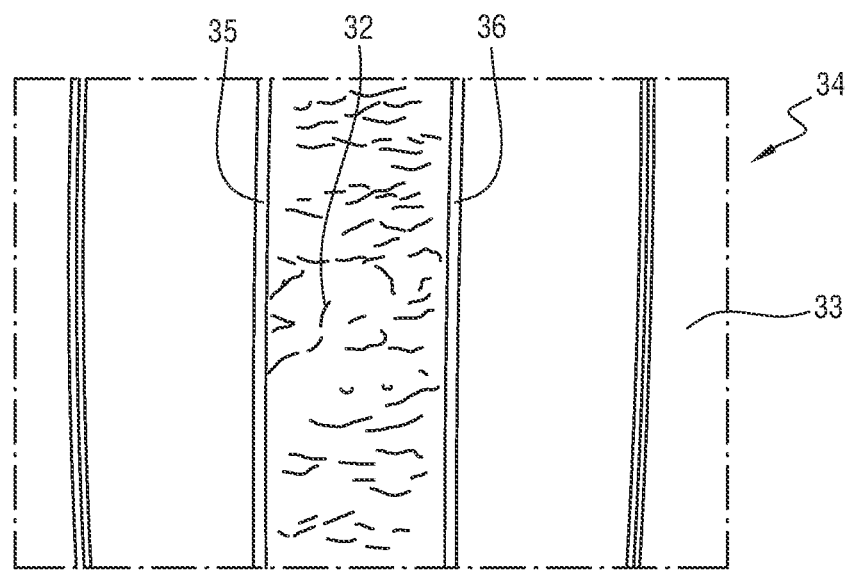
FIG. 15 shows the tread of a real tire in which cupping has formed.

FIG. 15 shows that cupping 32 has formed in the tread 33 of a real tire 34, between the groove 35 and the groove 36.

Figure 16:
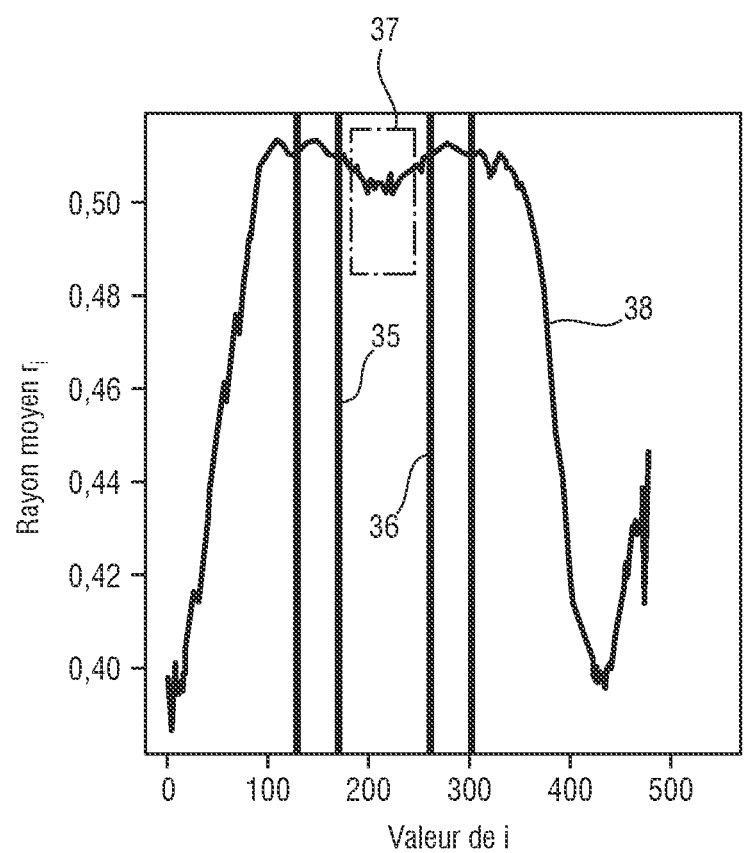
FIG. 16 is a graph plotting a curve showing how the mean radius of the registered tire corresponding to the real tire of FIG. 15 varies relative to the axis of rotation.

The curve 38 in FIG. 16 shows that the mean radius decreases in the curved portion 37 that lies between the two grooves 35 and 36, which is representative of the presence of cupping.

Clear or repeated variations in the mean radius may specifically be indicative of a surface presenting anomalies of the following types: cupping, bulging, abnormal excrescences, tearing, zig-zags, cracking, etc.

Figure 17:
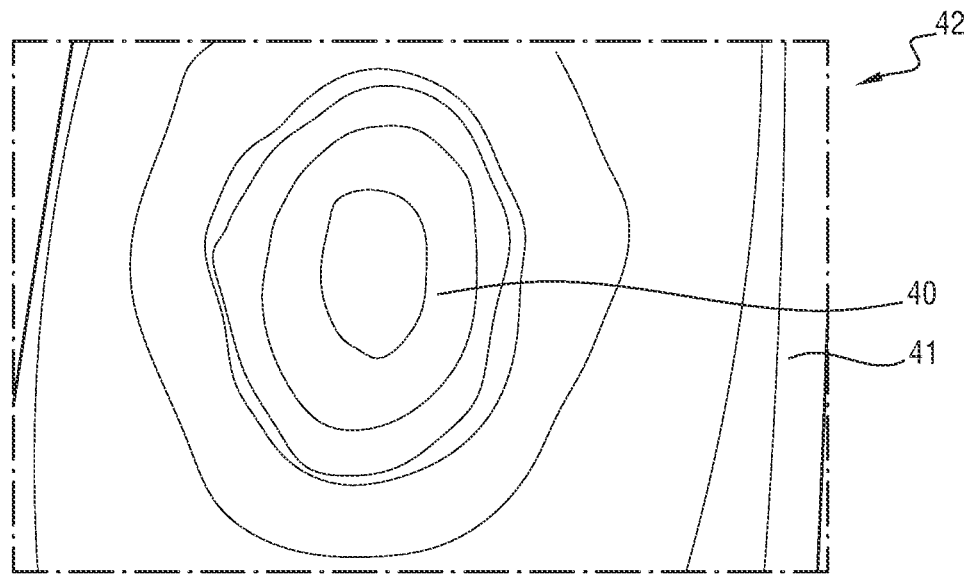
FIG. 17 shows the tread of a real tire that presents flattening.

FIG. 17 shows the presence of flattening (i.e. a flat spot) 40 present on the tread 41 of a real tire 42. This flat spot 40 is a result of braking without the real tire 42 rotating.

Figure 18:
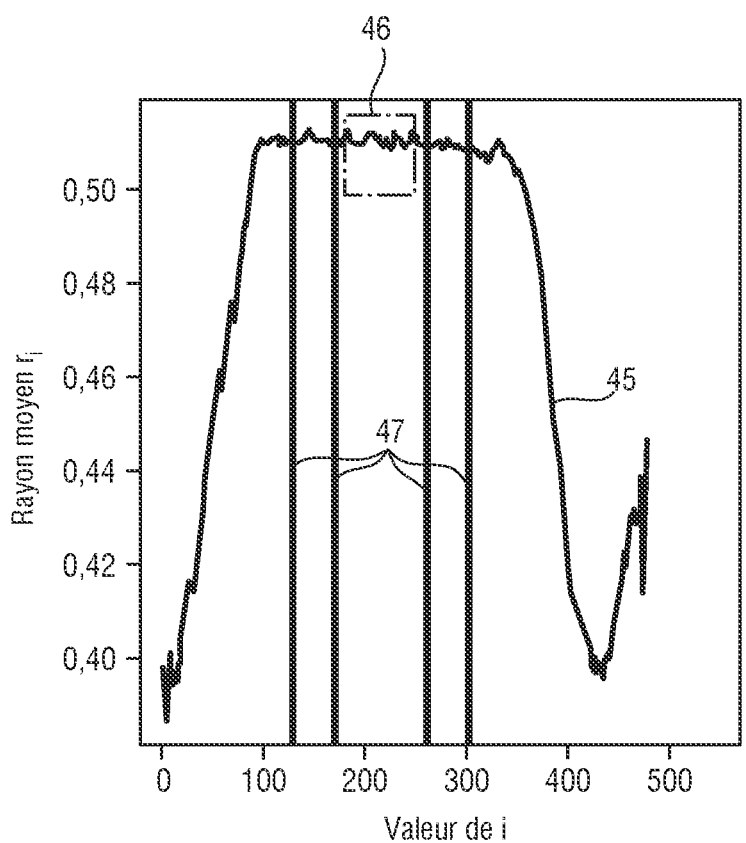
FIG. 18 is a graph plotting a curve showing how the mean radius of the registered tire corresponding to the real tire of FIG. 17 varies relative to the axis of rotation.

The flat spot 40 can be seen in the curve 45 of the graph of FIG. 18. Over a zone that is relatively flat, curve portion 46 presents a succession of small-amplitude peaks and troughs that are representative of the presence of the flat spot.

A curve portion of reduced mean radius cannot be seen: the grooves 47 are not detected because of the flat spot 40.

Figures 19, 20:
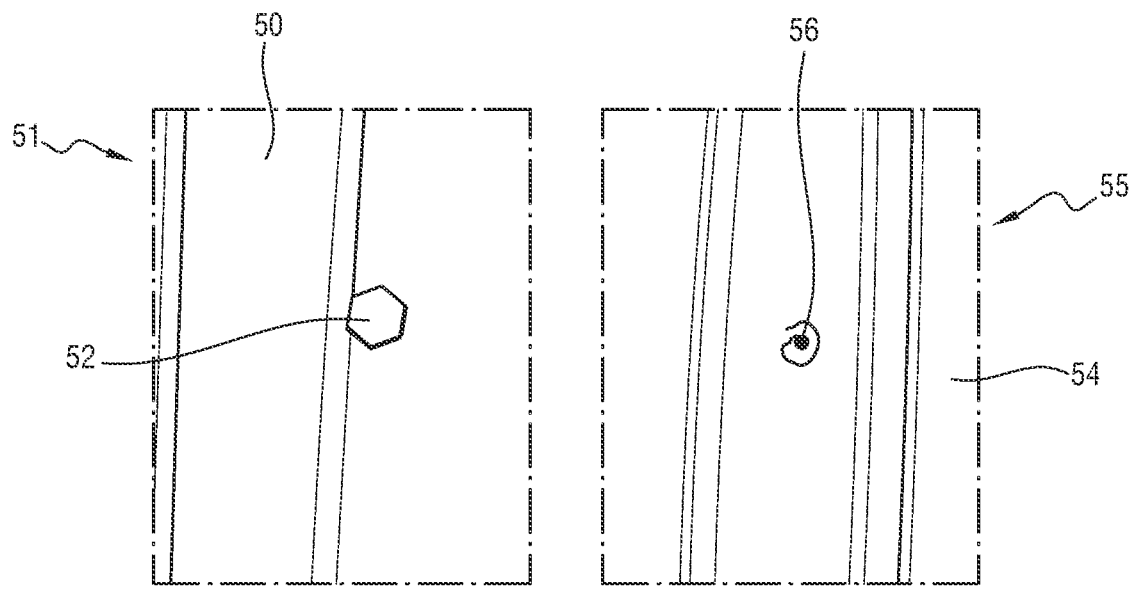
FIG. 19 shows the tread of a real tire having a nail plunged therein.
FIG. 20 shows the tread of a real tire that once had a nail plunged therein, after the nail has been removed, leaving a hole.

With reference to FIG. 19, it is also possible to detect the presence of a foreign body in the outer layer of the tread 50 of a real tire 51. By way of example, the foreign body is a nail 52 plunged into the tread 50. The presence of the nail 52 is detected by identifying a localized change in the mean radius of the registered tire within a given interval:

$$[(r,\Theta,z),(r+\delta1,\Theta+\delta2,z+\delta3)]$$

where [|δ1|, |δ2|, |δ3|] represent the dimensions of the emergent portion of the nail 52.

It should be observed that it is also possible to make use of color data in order to determine a localized difference exceeding a certain threshold, providing the foreign body presents a color or a brightness that is significantly different from the rubber of the real tire.

It is also possible to envisage using a specific sensor, e.g. an ultrasound sensor, in order to detect a change of material that is representative of the presence of a foreign body or indeed of the metal mesh of the tire becoming apparent.

It is also possible to detect an anomaly by analyzing a temperature gradient by using a suitable thermal camera, possibly incorporated in the smartphone.

FIG. 20 shows the tread 54 of a real tire 55 that has had a nail plunge therein, thereby forming a hole 56, with the nail subsequently becoming extracted from the tread 54.

Figure 21:
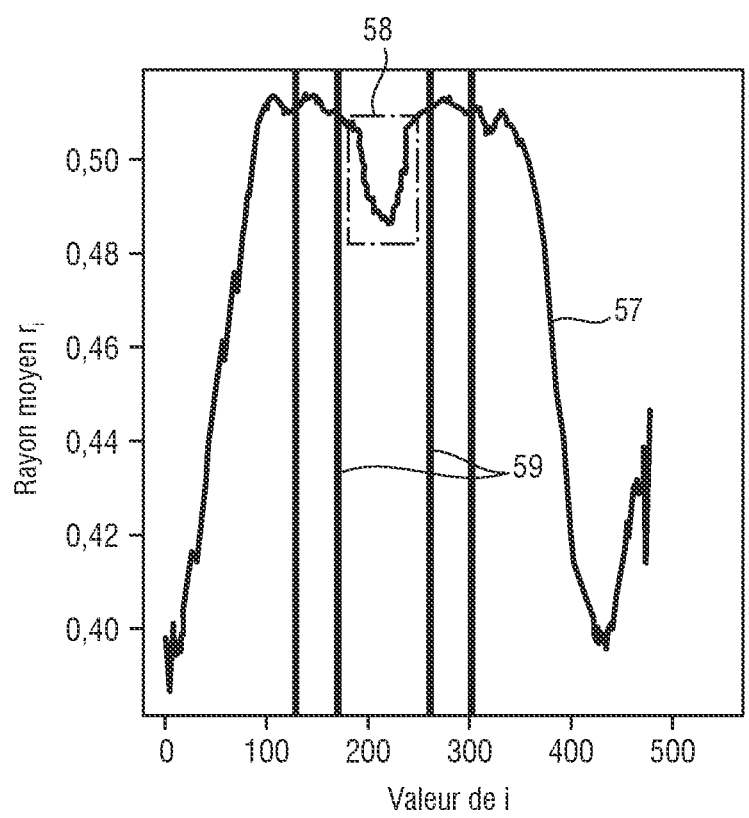
FIG. 21 is a graph plotting a curve showing how the mean radius of the registered tire corresponding to the real tire of FIG. 20 varies relative to the axis of rotation.

It can be seen from the curve 57 of the graph in FIG. 21 that the mean radius of the registered tire decreases considerably in the curve portion 58 between the two grooves 59, with this being representative of the presence of the hole formed by the nail.

As described above, in the first implementation, the transformation of the second three-dimensional object of the registered tire produces two-dimensional objects that are two-dimensional slices T2$d_i$ of the registered tire. In a second implementation, the transformation is a two-dimensional projection of the three-dimensional object 15. The two-dimensional objects include a two-dimensional image of the tread of the registered tire as obtained by performing said two-dimensional projection.

The two-dimensional objects also include respective two-dimensional images of the right sidewall and of the left sidewall of the registered tire. In order to obtain the images of the sidewalls, the shape of the sidewalls means that no two-dimensional projection is needed.

In order to perform a two-dimensional projection, use is made of cylindrical coordinates together with the following formulae:

$$x = R \cdot (\lambda - \lambda 0)$$

$$y = R \sim (\tan(\phi))$$

$\lambda$ corresponds to a current point of the projection, and $\lambda 0$ corresponds to a point set as the origin of the reference frame.

As mentioned above, colors are also available in association with the capture points in the set of acquired capture points stored by the smartphone.

The two-dimensional images is analyzed by analyzing variation in a color gradient of the two-dimensional image and/or by applying a Hough transform to the two-dimensional image.

Analyzing color gradient variation serves to detect abnormal degradation that results in abnormal variation of the colors of the tread, while the Hough transform serves to detect contours, and thus to detect abnormal degradation that results in abnormal portions in relief on the tread.

Figure 22:
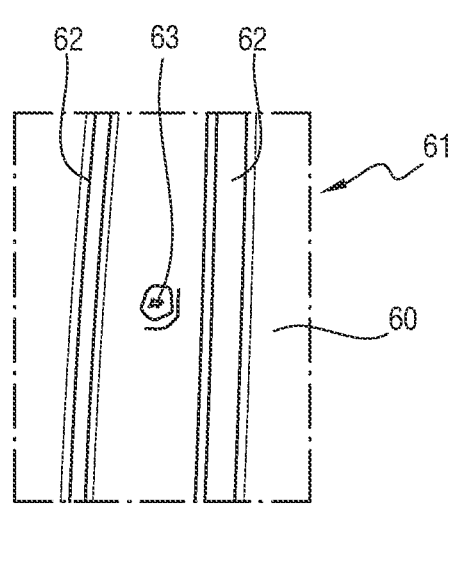
FIG. 22 shows the tread of a real tire, in which there can be seen two grooves and one hole.
Figure 23:
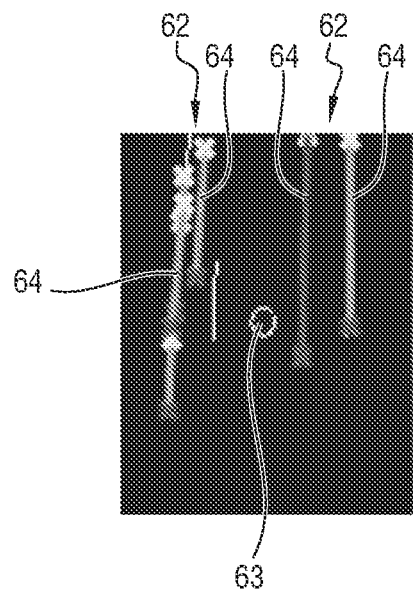
FIG. 23 shows the application of a Hough transform to a two-dimensional image corresponding to FIG. 22.

FIG. 22 shows the tread 60 of a real tire 61 on which there can be seen two grooves 62 and a hole 63. Two-dimensional projection is applied to the second three-dimensional object in order to obtain a two-dimensional image of the tread. The Hough transform is then applied to the image in order to obtain the image of FIG. 23.

It is considered that each groove is defined by two lines in a two-dimensional plane, each line corresponding to a respective edge of said groove. The Hough transform thus makes it possible to detect the grooves 62, each of which is defined by two lines 64, and also to detect the hole 63.

Figure 24:
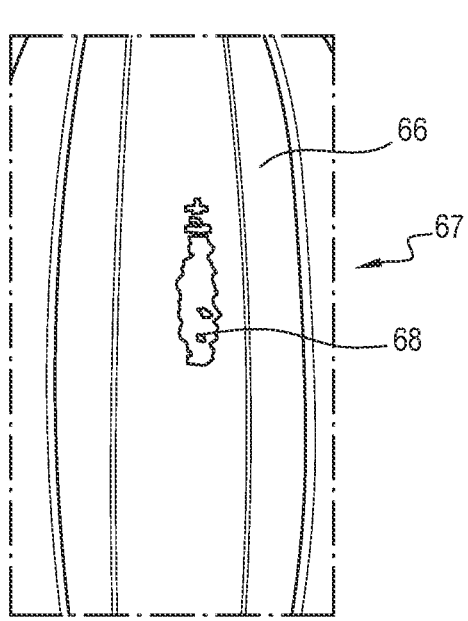
FIG. 24 shows the tread of a real tire, in which the metal mesh of the real tire has become apparent.

FIG. 24 shows the tread 66 of a real tire 67, with the metal mesh 68 of the real tire 67 being visible. The metal mesh 68 is visible because of excessive wear of the real tire 67. By way of example, the excessive wear may be due to an excessive amount of heat being given off over a portion of the real tire 67 as a result of a braking problem, a runway that is wet or frozen, etc.

Figure 25:
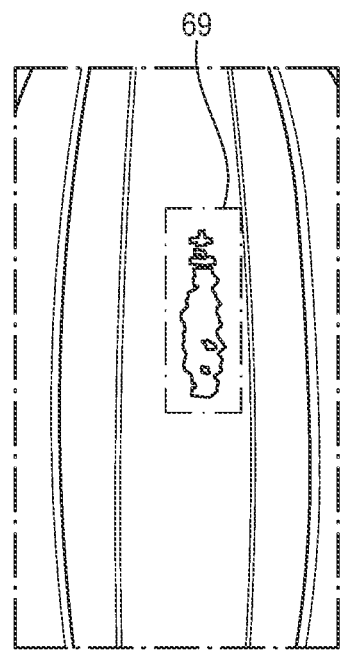
FIG. 25 shows the color gradients of FIG. 24.

FIG. 25 shows variation in the color gradient in the two-dimensional image.

A zone 69 can be identified in which abnormal color differences are to be observed, which in this example are representative of the metal mesh 68 becoming apparent.

With reference to FIG. 26, a tread may include a flat spot. The flat spot is characterized by a circular shape on the tread.

The two-dimensional image of the tread is produced, the two-dimensional image is then processed in order to remove noise that might impede a detection, and then the Hough transform is applied to the two-dimensional image. More specifically, in this example, a circle Hough transform (CHT) type algorithm is applied.

The Hough transform serves to obtain a shape 70 that is representative of a flat spot.

With reference to FIG. 27, the tread 71 of a real tire 72 may also be degraded by wear associated with heat being given off or with contamination by a corrosive liquid (oil, brake fluid, etc.).

In the event of damage of this type, variation of the color gradient is used to identify zones that present granularity that is abnormal. Since the real tire 72 is made out of a single material, it can be assumed that if the real tire 72 is in a normal state, then any observed color gradient will be simple, and associated solely with external factors such as exposure to the sun. In contrast, the presence of discontinuity in the linearity of the color gradient, or indeed the presence of zones that present colors that differ from the colors of the remainder of the real tire and that are not associated with exposure to external light, are signs of degradation of the rubber layer of the tread 71.

FIG. 28 shows how the color gradient varies when the real tire is not contaminated. FIG. 29 shows how the color gradient varies when the real tire is contaminated.

The differences between these two figures showed clearly that color gradient variation is a parameter that is relevant for detecting contamination of a real tire.

Figures 30, 32:
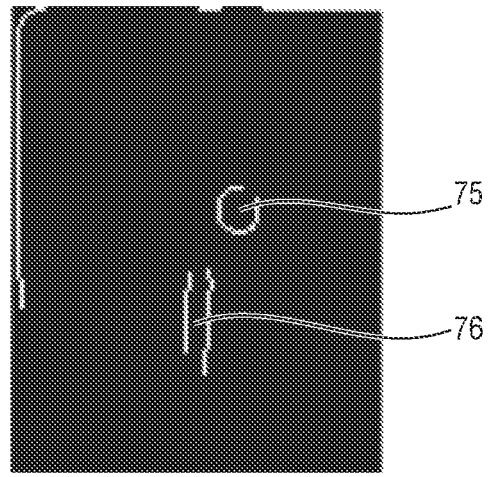
FIG. 30 shows the use of a contour-detection filter in HSV space, implemented on a two-dimensional image obtained from the tread of FIG. 19.
FIG. 32 is a contour detection matrix.

With reference to FIG. 30, by using a filter for detecting contours in hue-saturation-value (HSV) space, it is possible to detect a foreign body in the real tire, and also a groove of the real tire.

The shape 75 corresponds to the nail 52 in FIG. 19, while the shape 76 corresponds to the groove situated immediately to the left of the nail 52 in FIG. 19.

The two-dimensional images obtained by two-dimensional projection of the second three-dimensional object 15 of the registered tire can also be analyzed by training neural networks on the basis of images of the real tire in good condition and of images of various kinds of degradation that are to be found.

Use is made of a database having a very large amount of data constituted by similar two-dimensional images acquired from a very large number of real tires.

Since the two-dimensional projections are performed in a standardized manner, the two-dimensional images can be compared effectively, while eliminating the differences that are due to the ways in which the data is acquired (and thus differences that are not relevant for analysis).

During a preliminary stage, the data needs to be classified manually into a plurality of distinct categories.

Convolutional neural networks (CNN or CovNets) are used to provide the prediction algorithm.

Figure 31:
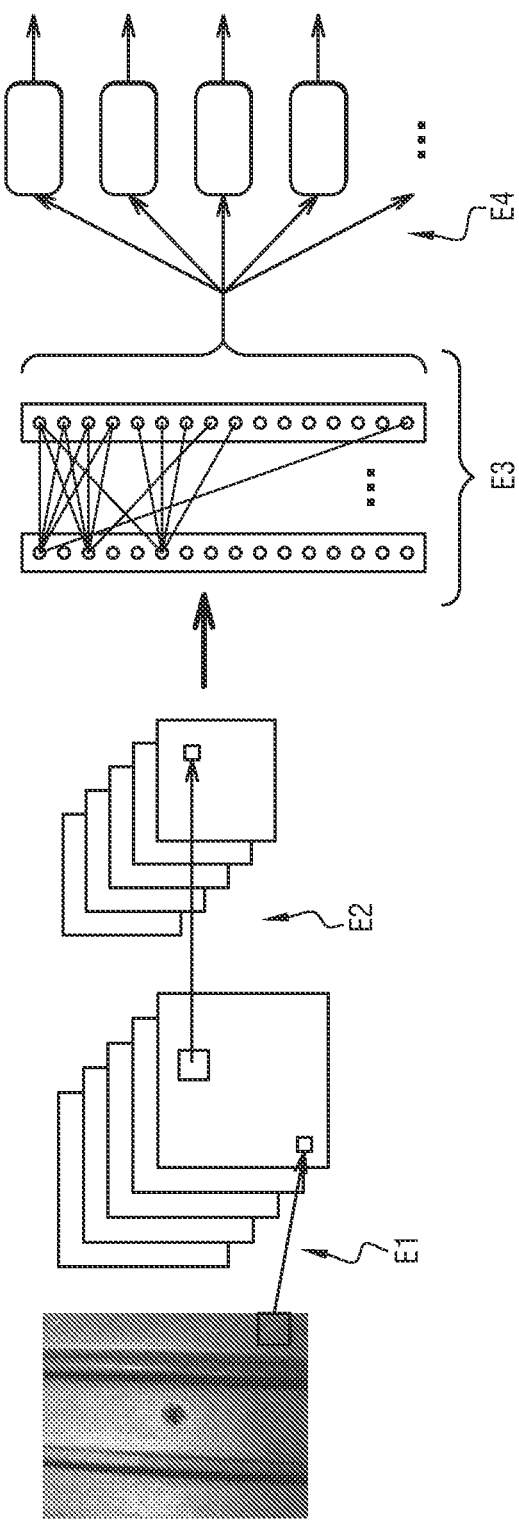
FIG. 31 shows training steps based on neural networks and performed on two-dimensional images.

With reference to FIG. 31, for a given two-dimensional image, training comprises an initial step of convoluting the two-dimensional image with a predefined matrix (step E1). In this example, the contour detection matrix of FIG. 32 is used.

Thereafter, a correction function is applied.

By way of example, the function used is of the rectified linear unit (ReLu) type.

$$f(x) = \max(0, x);$$

or else a hyperbolic tangent function:

$$f(x) = \tan h(x);$$

or else a saturating hyperbolic tangent function:

$$f(x) = |\tan h(x)|$$

or else a sigmoid function:

$$f(x) = (1 + e^{-x})^{-1}.$$

Thereafter, a pooling (or, commoning) operation is performed to reduce the size of the two-dimensional image (step E2).

It is then possible to process each of the zones of the two-dimensional image in individual manner via an artificial neural network (step E3).

The last step (step E4) consists in applying the Softmax formula:

$$P_j = \frac{e^{o_j}}{\sum_k e^{o_k}} \quad [\text{Math. 2}]$$

The input layers of the neural network are thus converted into a distribution probability. It is then possible to classify the two-dimensional image data and to detect abnormal degradation in the two-dimensional images.

It is also possible to implement neural network training directly on the second three-dimensional objects of the registered tire.

In a first step, once again, the data needs to be classified manually into a plurality of distinct categories.

In order to prepare the prediction algorithm, use is made likewise of convolutional neural networks (CNN or CovNets).

It should be observed at this point that, when degradation of a real tire is detected, a warning message is generated. The warning message may be issued by the smartphone for the attention of the ground operative, or else it may be transferred from the smartphone to a server that centralizes warning messages coming from a large number of real tires (e.g. all of the real tires used by an airline).

The warning message contains means for identifying the tire in question (e.g. a reference of the tire or its position on the airplane), optionally together with the type of the degradation and its position on the tire.

The set of capture points together with the results of the analyses performed are stored, and they can be used for the purposes of verification and data analysis on a large scale. Such analysis may reveal correlations between excessive deterioration of tires and particular runways, particular takeoff, landing, or taxiing situations, particular weather, the way certain pilots pilot airplanes, etc.

Naturally, the invention is not limited to the implementations described, but covers any variant coming within the ambit of the invention as defined by the claims.

The invention claimed is:

1. A method of detecting a degradation of a real tire of a wheel standing on the ground, the method comprising the steps of:
   acquiring at least one first three-dimensional object representative of a shape of the real tire by using an electronic appliance including at least one three-dimensional sensor, the first three-dimensional object being made up of a set of capture points;
   distinguishing between capture points belonging to the real tire and capture points belonging to the ground, and determining a position for a center point of the real tire from the set of capture points belonging to the real tire;
   registering the first three-dimensional object relative to a theoretical tire of known dimensions and orientation in order to obtain a second three-dimensional object forming a registered tire, the registration consisting in finding a transformation that serves to minimize the difference between the set of capture points and a cloud of theoretical points corresponding to the theoretical tire;
   transforming the second three-dimensional object in order to obtain one or more two-dimensional objects; and
   analyzing the two-dimensional object(s) in order to detect degradation of the real tire.

2. The detection method according to claim 1, comprising the step of defining, for each capture point, a normal vector that is normal to a surface of the first three-dimensional object and that passes through said capture point, and the step of estimating the position of the center point of the real tire from the normal vectors.

3. The detection method according to claim 2, wherein the position of the center point is estimated by an iterative process during which, on each iteration, capture points that do not belong to the real tire are eliminated, capture points that belong to the real tire are conserved, and the estimate of the position of the center point is refined by using the normal vectors of the capture points belonging to the real tire.

4. The detection method according to claim 1, comprising a step of performing a data partitioning method to distinguish between the capture points belonging to the real tire and the capture points belonging to the ground.

5. The detection method according to claim 1, wherein registering makes use of a registration algorithm based on Euclidean transformations.

6. The detection method according to claim 5, wherein registering also uses an ICP algorithm.

7. The detection method according to claim 1, wherein transforming comprises the step of slicing the second three-dimensional object on planes perpendicular to the axis of rotation of the registered tire in order to obtain a plurality of three-dimensional slices of small thickness, and the step of approximating each three-dimensional slice by a two-dimensional slice of zero thickness, the two-dimensional object(s) comprising the two-dimensional slices.

8. The detection method according to claim 7, comprising the steps, for each two-dimensional slice, of calculating a radius $ri(\alpha)$ for the two-dimensional slice, which radius is a function of an angle $\alpha$ about the axis of rotation of the registered tire.

9. The detection method according to claim 8, wherein for each two-dimensional slice, a mean radius is calculated for the two-dimensional slice, and wherein variation of the mean radius as a function of i is investigated, where i is the index of the slice.

10. The detection method according to claim 9, wherein variation of the mean radius is used to detect abnormal degradation of the tread of the real tire, as constituted by asymmetrical wear or by flattening or by bulging or by cupping or by the presence of a foreign body.

11. The detection method according to claim 10, wherein the positions of grooves in the tread are detected and depth is evaluated for each groove, the depths of the grooves being used to detect degradation that is excessive or abnormal, and the positions of the grooves are used to locate degradation that is excessive or abnormal.

12. The detection method according to claim 1, wherein the electronic appliance further includes a photographic sensor arranged to acquire color associated with each capture point, wherein transforming comprises two-dimensional projection applied to the second three-dimensional object, and wherein the two-dimensional object(s) comprise a two-dimensional image of the tread of the registered tire as obtained by said two-dimensional projection.

13. The detection method according to claim 12, wherein analyzing the two-dimensional image comprises the step of analyzing variation of a color gradient in the two-dimensional image.

14. The detection method according to claim 13, wherein the analyzed variation of the color gradient is used to detect abnormal degradation as constituted by excessive wear leading to a metal mesh of the real tire becoming apparent or as constituted by heat being given off or by contamination.

15. The detection method according to claim 12, wherein analyzing the two-dimensional image comprises the step of applying a Hough transform to the two-dimensional image.

16. The detection method according to claim 15, wherein the Hough transform serves to detect abnormal degradation as constituted by flattening or by bulging or by cupping or by the presence of a foreign body on the tread.

17. The detection method according to claim 12, wherein analyzing the two-dimensional image comprises the step of performing training based on convolutional neural networks applied to images of the real tire in good condition and also to images of the various looked-for degradations.

\* \* \* \* \*